Figure 1:
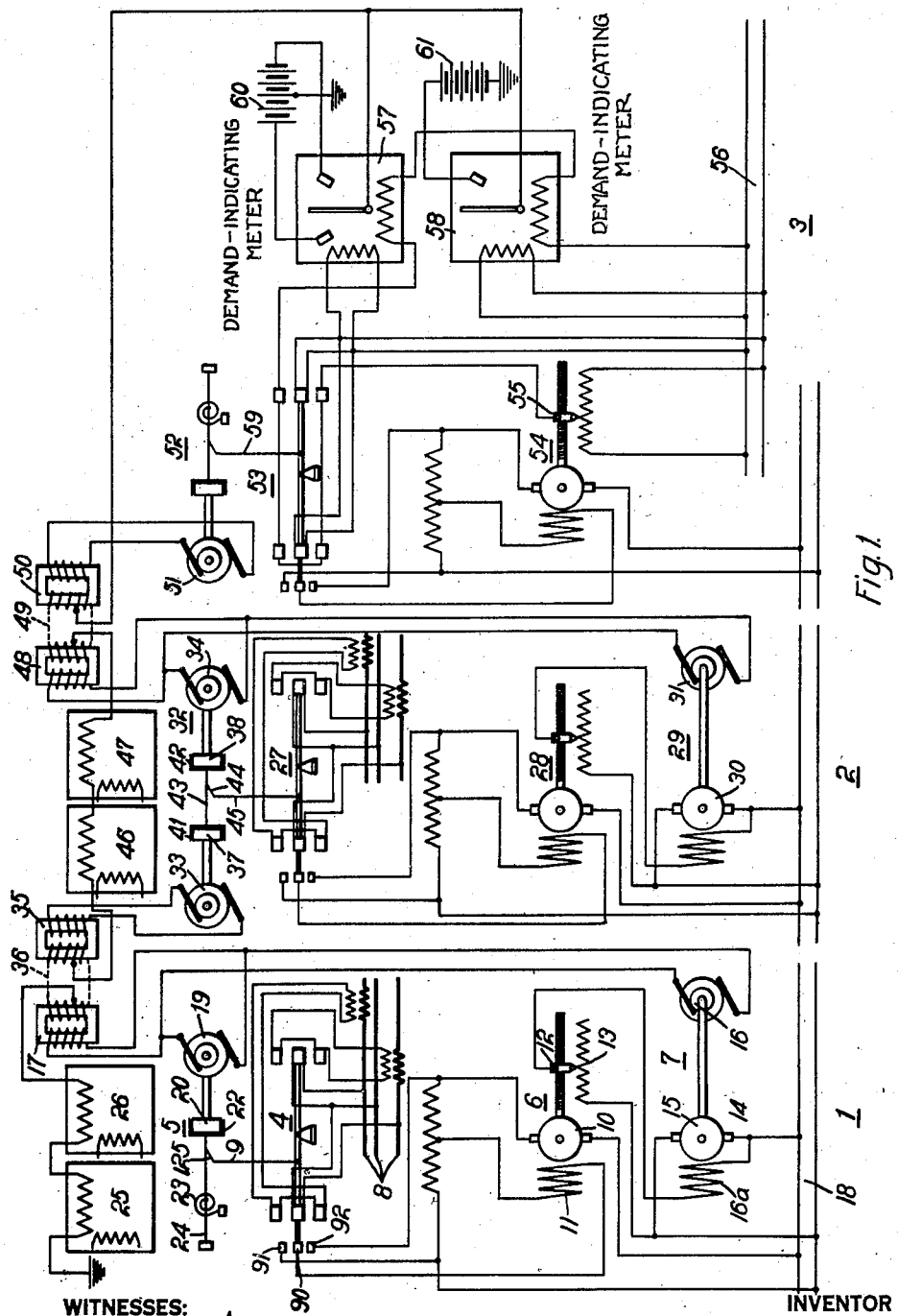

Dec. 15, 1925. 1,565,411
C. A. BODDIE
LOAD REGULATOR SYSTEM
Original Filed April 14, 1920 2 Sheets-Sheet 1

WITNESSES:
H. B. Funk.
W. B. Wells

INVENTOR
Clarence A. Boddie
BY
Wesley G. Carr
ATTORNEY

Dec. 15, 1925.
C. A. BODDIE
1,565,411
LOAD REGULATOR SYSTEM
Original Filed April 14, 1920     2 Sheets-Sheet 2
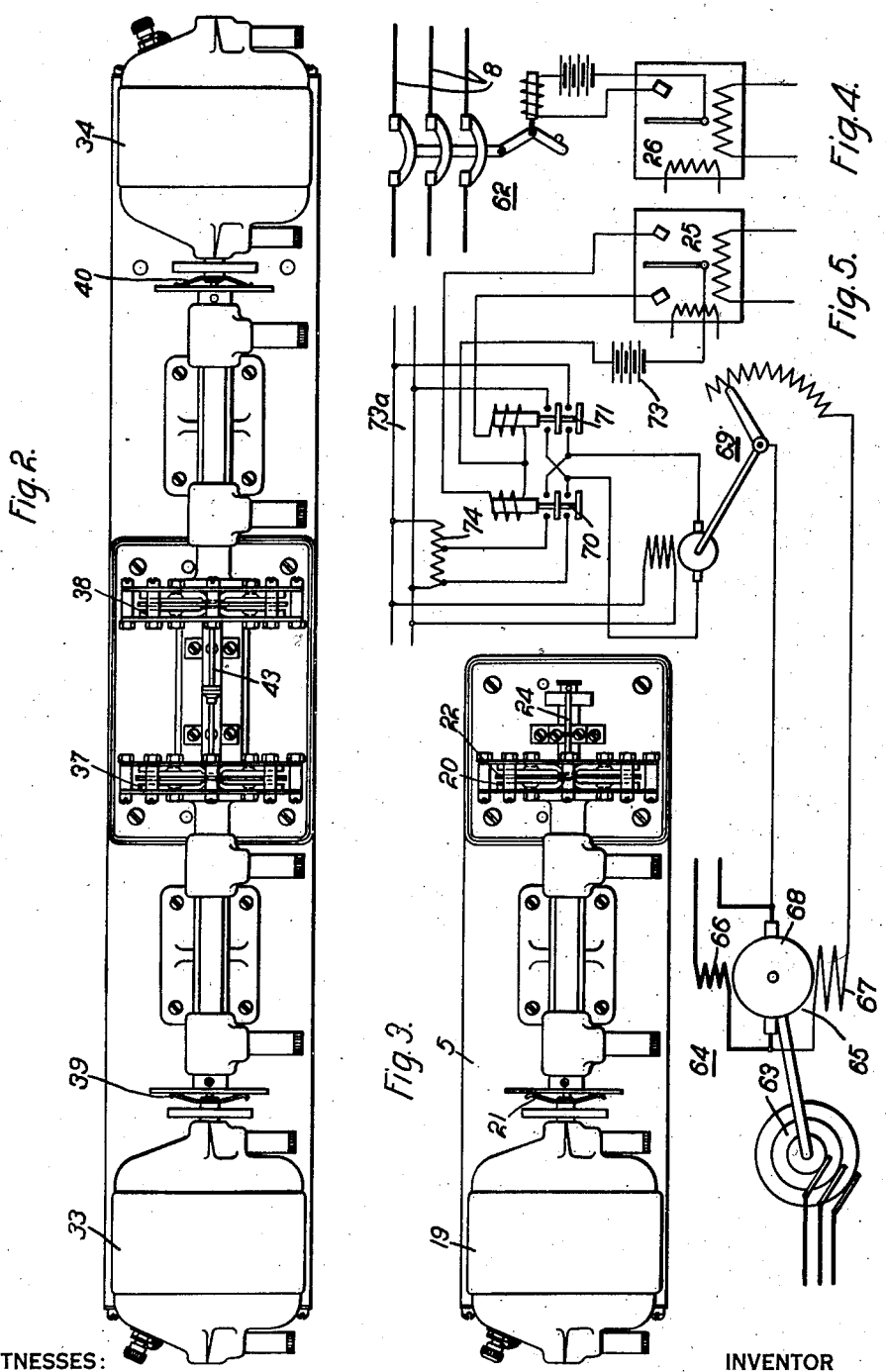
WITNESSES:
H.B. Funk.
W. B. Wells.
INVENTOR
Clarence A. Boddie
BY
Charles G. Carr
ATTORNEY Patented Dec. 15, 1925.

1,565,411

UNITED STATES PATENT OFFICE.

CLARENCE A. BODDIE, OF PITTSBURGH, PENNSYLVANIA, ASSIGNOR TO WESTINGHOUSE ELECTRIC AND MANUFACTURING COMPANY, A CORPORATION OF PENNSYLVANIA.

LOAD-REGULATOR SYSTEM.

Application filed April 14, 1920, Serial No. 373,826. Renewed September 18, 1924.

*To all whom it may concern:*

Be it known that I, CLARENCE A. BODDIE, a citizen of the United States, and a resident of Pittsburgh, in the county of Allegheny and State of Pennsylvania, have invented a new and useful Improvement in Load-Regulator Systems, of which the following is a specification.

My invention relates to load-regulator systems and particularly to regulator systems for governing the power delivered by a number of supply stations.

One object of my invention is to provide a load-regulator system that shall embody means for summating the power delivered by a number of supply stations and that shall automatically govern the supply stations in accordance with the total power demand.

Another object of my invention is to provide an improved load-regulator system operating in accordance with average load demand and substantially unaffected by momentary fluctuations of load.

In operating an electric system, for example, an electric railway system having a number of supply stations, it is often desirable and, in some cases, essential to keep the total power demand that is supplied by the various stations to the electric system below a predetermined value. This is especially true in case the cost of the power is in accordance with the maximum load demand during any period of time.

In practicing my invention, wattmeters such as Kelvin balances are provided at the supply stations for measuring the power delivered by the various stations. Alternating-current generators are provided for generating voltages having frequencies proportional to the indications of the respective balances and synchronous motors are so flexibly connected between the generators and the balances that the successive balances indicate the summation of the indications of the preceding balances. The current, the frequency of which represents the power delivered by the supply stations, is transmitted over two conductors to demand meters at a dispatcher's station. Such demand meters control transmitting apparatus for sending impulses of various voltages over the two conductors either to vary the voltage of the current supplied by the stations or to open the supply circuits at the various stations.

In the accompanying drawings, Figure 1 is a diagrammatic view of a regulator system constructed in accordance with my invention; Figs. 2 and 3 are, respectively, side-elevational views of controlling devices located at intermediate and terminal stations of the system disclosed in Fig. 1, and Figs. 4 and 5 are diagrammatic views of details of the means for controlling the power delivered by the various supply stations.

Referring to Fig. 1 of the drawings, energy is delivered by supply stations 1 and 2 to a transmission circuit or an electric-railway circuit (not shown) and the energy delivered by such stations is measured at a dispatcher's station 3 which is widely separated from the supply stations 1 and 2.

The supply station 1 comprises a Kelvin balance 4, a control device 5, which is connected to the Kelvin balance, a motor 6, which is governed by the Kelvin balance, and a motor-generator set 7 which is governed in accordance with the operation of the motor 6. The Kelvin balance 4 is operated in accordance with the power delivered by a three-phase supply circuit 8 and is connected to the control device 5 by means of a member 9 for a purpose to be hereinafter set forth. The Kelvin balance carries a movable contact member 90 which is adapted to engage stationary contact members 91 and 92, according to the power delivered by the supply station. The motor 6 comprises an armature 10 and a field winding 11. The rotation of the armature 10 controls a contact member 12 for varying the value of a resistor 13 which is included in circuit with the field winding of the motor of the motor-generator set 7. The motor-generator set 7 comprises a direct-current motor 14 having an armature 15 and a field winding 16ª and an alternating-current generator 16 which is connected to a transformer 17 and to the device 5 for a purpose to be hereinafter set forth.

Upon engagement between the contact members 90 and 91, a circuit is completed from an auxiliary supply circuit 18 for operating the motor 6 in a clockwise direction to so vary the resistor 13 as to decrease the speed of the motor-generator set 7 and, accordingly, to decrease the frequency of the current generated by the machine 16. Upon engagement between the contact members 90 and 92, the motor 6 is operated to increase the speed of the motor generator 7 and, accordingly, to increase the frequency of the current delivered by the machine 16.

The controlling device 5 comprises a synchronous motor 19, which is connected across the circuit of the machine 16, and a system of rotatable permanent magnets 20 that are connected, through a spring 21, to the motor 19 (Fig. 3 of the drawing). A disk armature 22 and a spring 23 are mounted on a shaft 24 upon which a lever arm 125 is also mounted to connect, through the member 9, to the balance 4.

In the system so far described, the Kelvin balance 4 is operated in accordance with the power delivered by the station, and the motor 6 is controlled by the Kelvin balance to operate the motor-generator set 7 at a speed proportional to the power delivered by the station. Consequently, it is apparent that the frequency of the current produced by the generator 16 is proportional to the power delivered by the station. The motor 19 is operated in synchronism with the generator 16 and thus causes the member 9 to exert a controlling torque on the balance 4 that is proportional to the power being measured. The spring 23, which opposes the action of the synchronous motor 19, may be set for any standard or fundamental frequency transmitted from the supply station 1. Thus, when no power is being delivered by the supply station 1, the spring 23 will counter-balance the action of the motor 14 upon the balance 4 and, consequently, will transmit a standard frequency from the supply station to the dispatcher's station. Whenever any power is delivered by the supply station, the Kelvin balance is operated in accordance therewith for controlling the motor-generator set 7 to transmit a frequency in accordance with such change.

The station 1 is further provided with two relays 25 and 26 for governing the operation of various control apparatus which will be described more in detail when reference is made to Figs. 4 and 5.

The station 2 comprises a Kelvin balance 27, which is similar to the Kelvin balance disclosed in station 1, and a motor 28 and a motor-generator set 29, which are similar to the motor 6 and the motor-generator set 7, which were described in connection with the supply station 1. The motor-generator set 29 comprises a propelling motor 30 and an alternating-current generator 31. The balance 27 is operated in accordance with the power delivered by the supply station 2 to control the operation of the motor-generator set 29 which, in turn, generates a current the frequency of which varies in accordance with the power delivered by the supply station 2.

The balance 27 is provided with a controlling device 32, shown in detail in Fig. 2 of the drawings, which comprises two synchronous motors 33 and 34. The motor 33 is operatively connected to the generator 16 by means of a transformer 35, a circuit 36, and the transformer 17 in order to be operated in accordance with the frequency produced by the generator 16. The motor 34 is directly connected to the generator 31 and, accordingly, is operated in accordance with the power delivered by the supply station 2. The motor 33 actuates permanent magnets 37, and the motor 34 actuates permanent magnets 38 through spring connections 39 and 40, respectively. Two disk armatures 41 and 42 are mounted on a shaft 43 upon which a lever arm 44 is also mounted. The lever arm 44 is operatively connected, through a member 45, to the balance 27. With this arrangement, the two motors 33 and 34 oppose each other in their actions on the shaft 43, whereby the balance 32 is so controlled that it indicates the sum of the power delivered to the system at the supply station 2 and also that indicated by the balance 4 of the supply station 1. The supply station 2 is provided with two relays 46 and 47 which are similar in construction and operation to the two relays 25 and 26 of the supply station 1. The generator 31 is connected to a transformer 48 which, in turn, is connected by a circuit 49 to a transformer 50 at the dispatcher's station 3.

In order to indicate the summation of power at the dispatcher's station 3, the transformer 50 is connected to a synchronous motor 51 of a controlling device 52 similar to the controlling device 5 illustrated in Fig. 3 of the drawing and described in connection with the supply station 1. A balance 53 is provided at the station 3 and controls a motor 54 which, through a potential regulator 55, governs the current traversing an alternating-current circuit 56. The balance 53 is connected to the circuit 56 and the respective current and potential windings thereof are connected in circuit with the respective current and potential windings of the demand meters 57 and 58. The demand meters are provided with contact members for transmitting impulses to the supply stations to control the load on the stations. The demand meters 57 and 58 may be constructed in accordance with the disclosure of my prior Patent #1,206,772 which issued Nov. 28, 1916.

The demand instrument described in said patent embodies retarding mechanism of such character that the movable element thereof is actuated in accordance with the average or time-integrated power demand. The employment of an instrument of this this type, which usually includes an integrating wattmeter element, the current and potential windings of which are shown on the drawing, is an important feature of my invention. The operation of the system shown is in accordance with fluctuations of power of appreciable duration only and is not affected my momentary overloads or short-circuits.

The motor 51 is actuated at a speed which is proportional to the summation of the frequencies generated by the generators 16 and 31 or, in other words, proportional to the sum of the power values indicated by the balances 5 and 32, whereby a connection 59 so controls the balance 53 that the latter indicates the summation of the power delivered to the system. The instrument 57 is controlled by the balance 53 for transmitting positive or negative impulses from a battery 60 over the circuits 49 and 36 to operate the relays 46 and 25, respectively, located at the supply stations 2 and 1. The relays 46 and 25 control the voltage of the current delivered by the supply stations in accordance with the fluctuations in the total load demand in a manner to be hereinafter described, with reference to Fig. 5 of the drawings. The instrument 58 serves to transmit an impulse of high voltage from the battery 61 over the circuits 49 and 36 for operating the relays 47 and 26 to open the supply circuits at the stations 1 and 2 when the total load demand exceeds a predetermined value. In operating the relays 46 and 47 and 25 and 26 by current received from the batteries 60 and 61, it will be noted that a ground-return circuit is provided.

Referring to Fig. 4 of the drawing, the relay 26 is illustrated as controlling the energization of a circuit breaker 62. Thus, when an impulse of high voltage is transmitted by the transmitter 58 to the relay 26, the circuit breaker 62 is operated to open all supply circuits at the station 1. The same operation takes place at the other stations along the line and, accordingly, whenever power above a predetermined value is being delivered, the relays controlled by the instrument 58 are operated to disconnect all supply stations from the electric system.

Referring to Fig. 5 of the drawing, the three-phase supply circuit 8 is connected to the alternating-current motor 63 of a motor-generator set 64. The direct-current generator 65 of the motor-generator set is provided with a series field winding 66, a shunt field winding 67 and an armature 68. The shunt field winding 67 is provided with a motor-operated rheostat 69 which is automatically controlled by the relay 25 in accordance with the power supplied by all the supply stations. The relay 25 selectively controls two switches 70 and 71 which, in turn, selectively operate the rheostat 69 to raise or lower the voltage of the generator 65 in accordance with the fluctuations in total load demand on the system. Thus, for example, in case a positive impulse is transmitted by the instrument 57 over the conductors 49 and 36, the relay 25 is operated to complete a circuit from the battery 73 through the operating coil of the switch 71. Thereupon, a circuit is completed from the source of supply 73 through the motor of the rheostat 69 for so operating the rheostat as to decrease the resistance included in circuit with the field winding 67 and, consequently, increase the voltage of the generator 65. In case a negative impulse is transmitted to the relay 25, the switch 70 is operated to increase the resistance included in circuit with the field winding 67 and, consequently, to reduce the voltage of the generator 65 and limit the load without de-energizing the load circuit. In the latter operation, it will be noted that a resistor 74 is included in circuit with the rheostat motor in order to operate the rheostat at a slower speed when reducing the voltage of the direct-current generator 65. A similar motor-generator set is provided at the supply station 2 which is controlled by the relay 46. Any suitable translating device connected between the supply and load circuits and controlled by the demand instrument may be substituted for the motor-generator set 64.

While only two supply stations are shown and described, it will be understood that this system may be applied to any number of supply stations by providing, in each of the additional stations, apparatus similar to that employed in the supply station 2.

Modifications in the system and arrangement and location of parts may be made within the spirit and scope of my invention and such modifications are intended to be covered by the appended claims.

I claim as my invention:

1. In a load-regulating system, the combination comprising a plurality of supply stations, a measuring system for summating the power delivered by the stations in terms of frequency, a plurality of demand instruments controlled by said measuring system and means including said instruments for varying the load on the stations and, under certain conditions, for opening the supply circuits.

2. In a load-regulating system, the combination comprising a plurality of supply stations, a measuring system for summating the power delivered by the stations in terms of frequency, and means controlled in accordance with the fluctuations in the total power demand for varying the load on the stations, said means comprising a demand instrument adapted to close one control circuit when the total demand exceeds a predetermined value and another control circuit when the total demand is less than another predetermined value.

3. In a load-regulator system, the combination comprising a supply station, means for summating the total power delivered by said station in terms of frequency, an instrument operated in accordance with the delivered frequency, and means governed by said instrument for varying the voltage delivered by the supply station under certain conditions and for opening the circuit at the supply station under different conditions.

4. In a load-regulator system, the combination comprising a plurality of supply stations, a pair of conductors for connecting said stations, means for summating the power delivered by the various stations and for transmitting the summation in terms of current frequency over said conductors, two demand meters of different characteristics, a control station having means controlled by the frequency of the current received for operating said meters to transmit regulating impulses over said conductors, and means controlled by said regulating impulses for governing the power delivered by the supply stations.

5. In a load-regulator system, the combination comprising a plurality of supply stations, a pair of conductors for connecting said stations, means for summating the power delivered by the various stations and for transmitting the summation over said wires, in terms of current frequency, to a control station, two demand meters, means controlled in accordance with the frequency of the current received for operating one or the other of said meters depending on the total load demand means including said meters for transmitting regulating impulses over said conductors, and means controlled at the supply stations by the regulating impulses received for governing the voltage of the current delivered by the supply stations.

6. In a load-regulator system, the combination comprising a plurality of supply stations, an auxiliary pair of conductors for connecting said stations, means for summating the power delivered by the various stations and for transmitting the summation in terms of current frequency over said conductors, and means actuated by the total frequency for transmitting control currents of different characteristics over said conductors for controlling the total power delivered by the supply stations.

7. In a load-regulator system, the combination comprising a plurality of supply stations each having means for transforming a delivered polyphase current into direct current, means for summating the power delivered to the various stations and for transmitting said summation in terms of current frequency to any control point, and means comprising demand meters governed in accordance with the received frequency for automatically varying the voltage of the current supplied by said stations and, under certain conditions, for opening the supply circuits at all stations.

8. In a load-regulator system, the combination comprising a plurality of supply stations, means for summating the power used by the various stations and for transmitting the summation, in terms of current frequency, to any control point, and automatic means at the control point governed in accordance with the received frequency for varying the voltage of the current at the supply stations and, under certain conditions, for opening the supply circuits at all stations.

9. In a load-regulating system, the combination comprising a plurality of supply stations, a measuring system for summating the power delivered by all of said stations, a plurality of demand instruments controlled by said measuring system and means including said instruments for varying the total load on the stations and, under certain conditions, for opening the supply circuits.

10. In a load-regulating system, the combination comprising a plurality of supply stations, a measuring system for summating the power delivered by all of said stations, control conductors extending to said stations, and means controlled by said measuring system for applying control currents of different characteristics to said conductors to control said stations.

11. In an electrical system, the combination of a plurality of substations, translating devices therein, a pair of conductors connecting said substations in series, means associated with said conductors at a point remote from said substations for transmitting current impulses of different characteristics thereover, and means responsive to said impulses for selectively controlling the translating devices.

12. In an electrical system, the combination of a substation, a translating device therein, a circuit, means for connecting said device to said circuit, control conductors extending from said substation to a remote point, and means at said remote point for transmitting varying control currents over said conductors to control the operation of said translating device and the connection of said device to said circuit.

13. In combination, a plurality of supply stations, means for totalizing the load-demand of all of said stations, a contact device actuated in accordance with the total average demand on said stations but substantially unaffected by flutuations in instantaneous load and means including said device for controlling said stations.

14. In combination, a circuit, means for measuring the load on said circuit, a translating device in said circuit and means actuated when the average load demand exceeds a predetermined value but substantially unaffected by fluctuations in instantaneous load for so controlling the translating device as to limit the current traversing said circuit.

15. In combination, a circuit, a demand instrument including a wattmeter element having current and potential windings associated with said circuit, means for energizing said instrument in accordance with the load on said circuit, a translating device in said circuit electrically controlled by said instrument and means including said translating device for limiting the current traversing said circuit upon a predetermined energization of said demand instrument.

16. In an electrical system, the combination of a substation, a translating device therein, a circuit, means for connecting said device to said circuit, control conductors extending from said substation to a remote point and means at said remote point for automatically controlling the operation of said translating device and the connection of said device to said circuit over said conductors in accordance with predetermined conditions in the system.

17. In combination, a supply circuit, a load circuit connected thereto, means for measuring the load on said load circuit, current-modifying means between said circuits and means actuated when the average load demand exceeds a predetermined value but substantially unaffected by the fluctuations in instantaneous load for so controlling the current-modifying means as to limit the load demand while maintaining the load circuit energized.

In testimony whereof, I have hereunto subscribed my name this 1st day of April, 1920.

CLARENCE A. BODDIE.